(12) United States Patent
Souchay et al.

(10) Patent No.: US 7,368,151 B2
(45) Date of Patent: May 6, 2008

(54) ANTISCATTERING GRID AND A METHOD OF MANUFACTURING SUCH A GRID

(75) Inventors: Henri Souchay, Versailles (FR); Remy Klausz, Neuilly sur Seine (FR); Guillaume Bacher, Palaiseau (FR); Bruno Gilles Richou, Bû (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/269,580

(22) Filed: Oct. 11, 2002

(65) Prior Publication Data

US 2003/0081731 A1 May 1, 2003

(30) Foreign Application Priority Data

Oct. 17, 2001 (FR) .................................. 01 13357

(51) Int. Cl.
*B05D 3/06* (2006.01)
*C08J 7/18* (2006.01)
*C23C 14/02* (2006.01)
*G21K 3/00* (2006.01)

(52) U.S. Cl. .................... 427/555; 427/534; 427/553; 378/154; 378/149; 378/147

(58) Field of Classification Search ................ 427/553, 427/558, 250, 535, 367
See application file for complete search history.

(56) References Cited

U.S. PATENT DOCUMENTS

| | | | | |
|---|---|---|---|---|
| 5,008,160 A | * | 4/1991 | Jenkin | 428/656 |
| 5,307,394 A | | 4/1994 | Sokolov | 378/34 |
| 5,389,473 A | | 2/1995 | Sokolov | 430/4 |
| 5,418,833 A | * | 5/1995 | Logan | 378/154 |
| 5,581,592 A | | 12/1996 | Zarnoch et al. | 378/154 |
| 5,606,589 A | | 2/1997 | Pellegrino et al. | 378/154 |
| 5,814,235 A | | 9/1998 | Pellegrino et al. | 216/12 |
| 5,970,118 A | | 10/1999 | Sokolov | 378/155 |
| 6,075,840 A | | 6/2000 | Pellegrino et al. | 378/154 |
| 6,175,615 B1 | * | 1/2001 | Guru et al. | 378/149 |
| 6,309,581 B1 | * | 10/2001 | Gervasi | 264/401 |
| 6,459,771 B1 | * | 10/2002 | Mancini | 378/154 |

FOREIGN PATENT DOCUMENTS

| | | |
|---|---|---|
| EP | 0681736 | 8/1994 |
| EP | 0967619 | 12/1999 |
| GB | 2221470 | 2/1990 |
| WO | 9417533 | 8/1994 |

OTHER PUBLICATIONS

Patent Abstracts of Japan, vol. 2000, No. 14, Mar. 5, 2000; JP 2000 319430 Nov. 21, 2000.
Patent Abstracts of Japan, vol. 008, No. 258, Nov. 27, 1984; JP 59-131430 Jul. 28, 1984.
Patent Abstracts of Japan, vol. 009, No. 097, Apr. 26, 1985; JP 59-223403 Dec. 15, 1984.
European Search Report; Application No. EP 02257225.9; Date of filing Oct. 17, 2002; Date of Publication Apr. 23, 2003.

* cited by examiner

*Primary Examiner*—William Phillip Fletcher, III
*Assistant Examiner*—Cachet I. Sellman
(74) *Attorney, Agent, or Firm*—Cantor Colburn LLP

(57) ABSTRACT

An antiscattering grid for an X-ray imaging apparatus of the type comprising a substrate having a plurality of metallized partitions that together define a plurality of cells distributed over the substrate. The partitions allow passage of the X-rays emitted from a source lying in line with the grid, and absorbing the X-rays not coming directly from this source. The substrate is made of a polymer material that may be formed by radiation curing of a monomer sensitive to this radiation. The substrate may be substantially planar and the partitions may be oriented to form a focused grid.

53 Claims, 4 Drawing Sheets

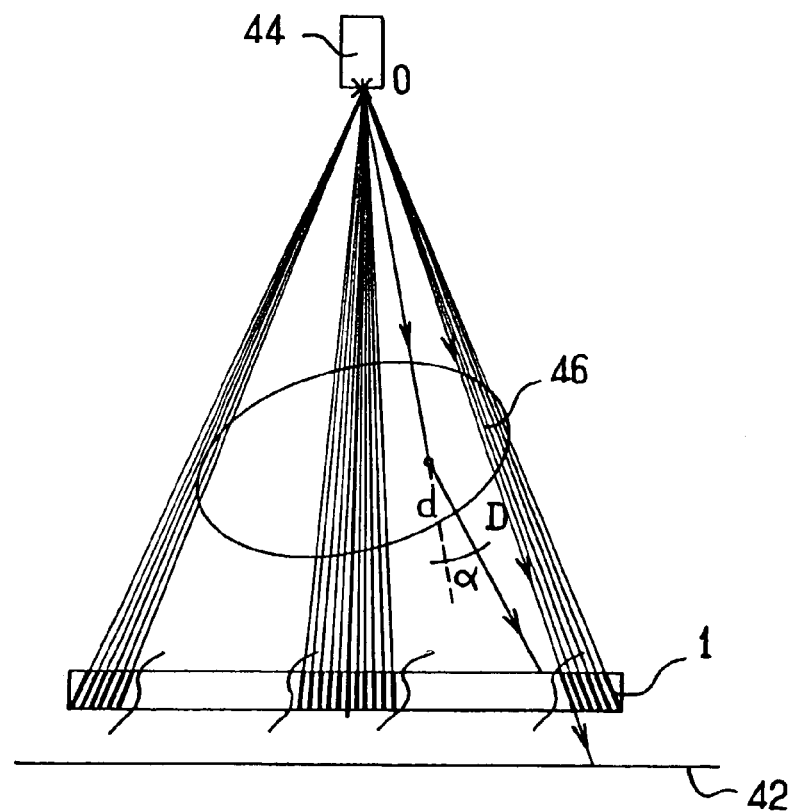
FIG_1
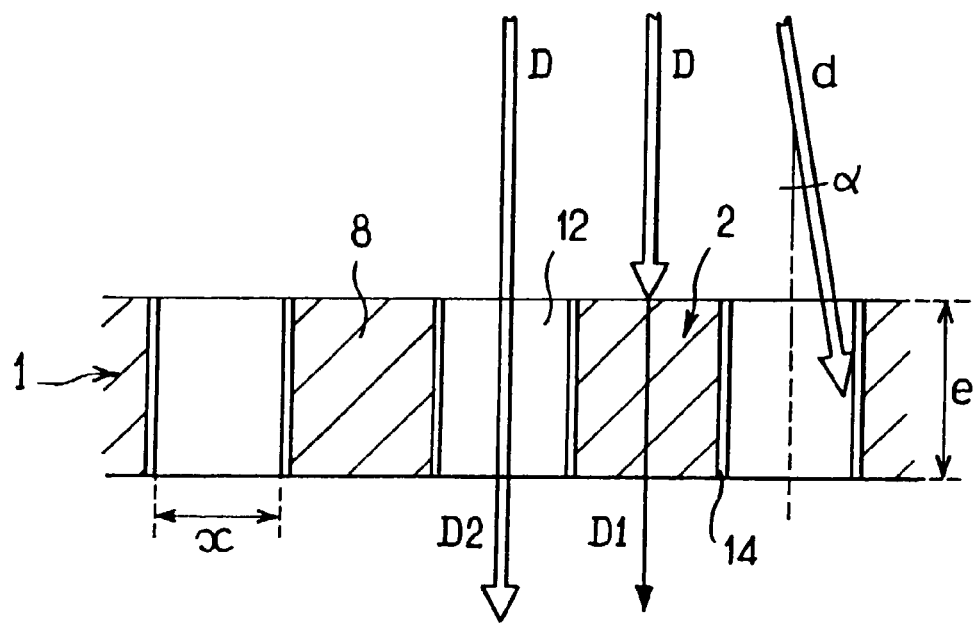
FIG_2

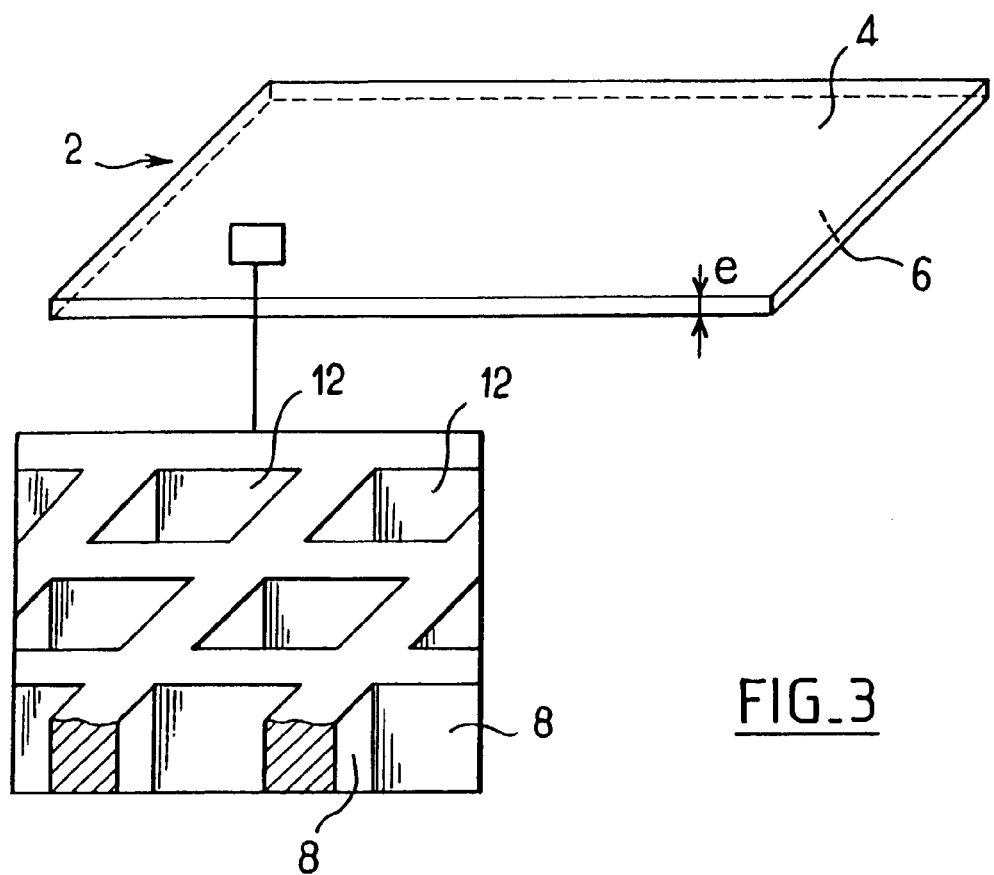
FIG_3
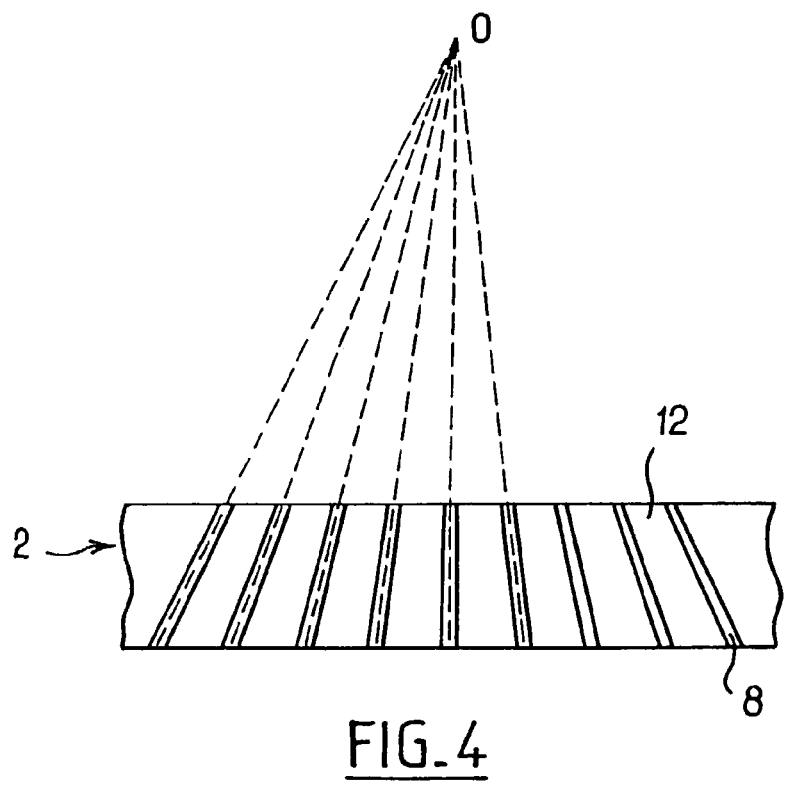
FIG_4

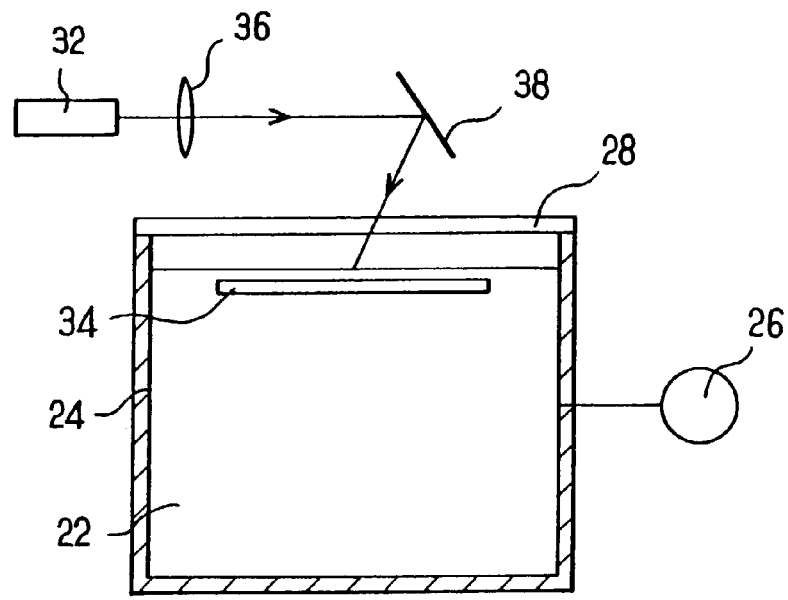
FIG_5
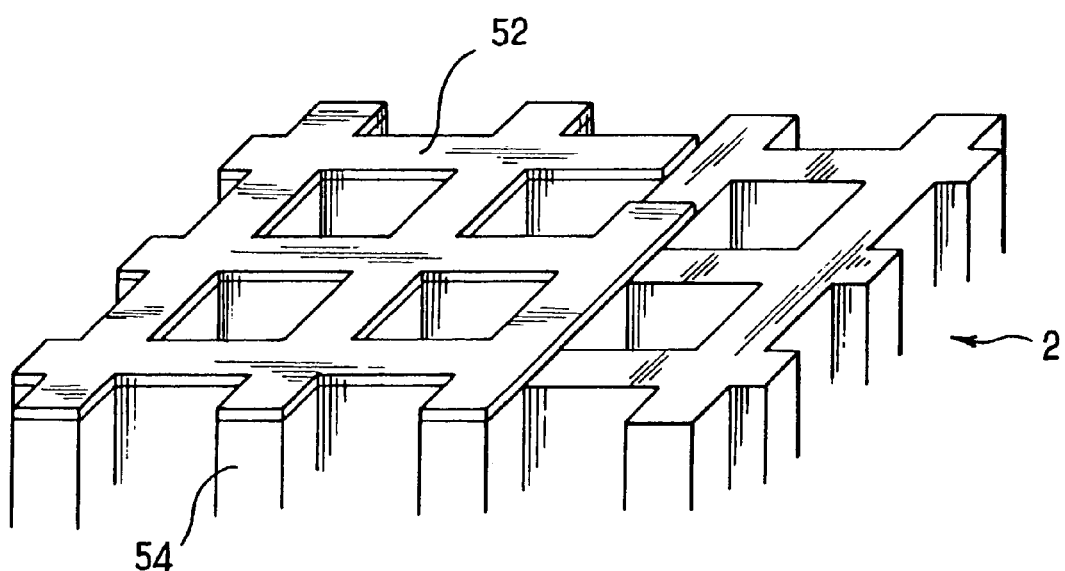
FIG_6

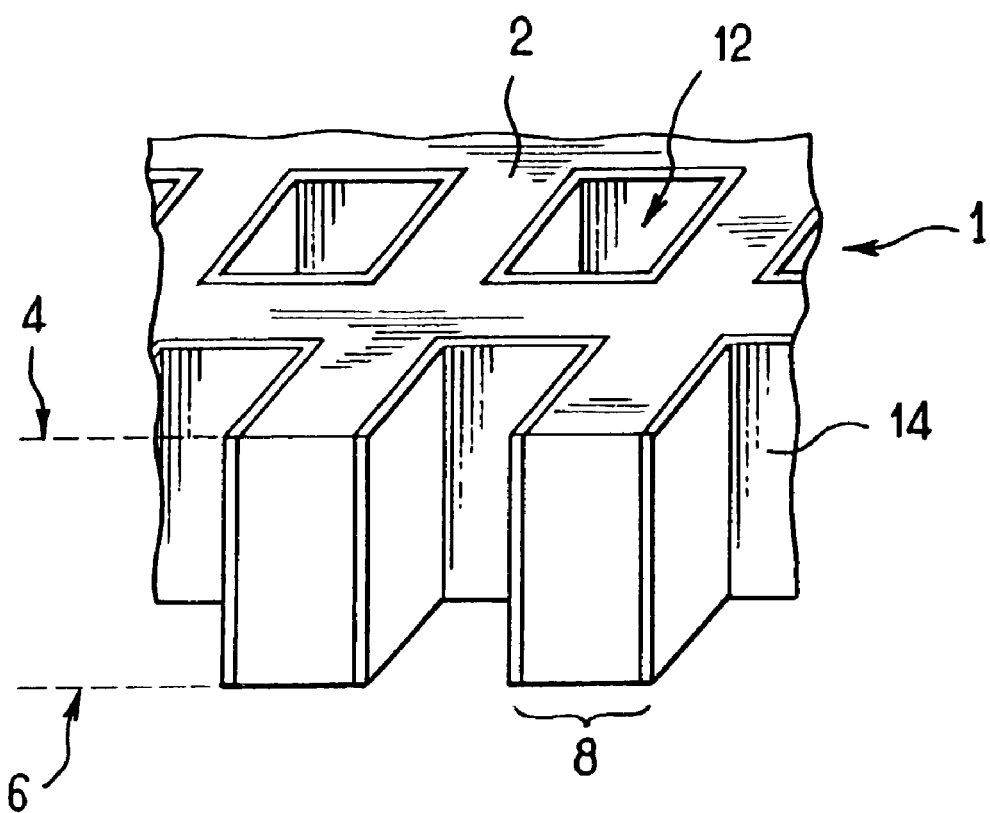
FIG_7

ANTISCATTERING GRID AND A METHOD OF MANUFACTURING SUCH A GRID

CROSS-REFERENCE TO RELATED APPLICATIONS

This application claims the benefit of a priority under, 35 USC 119 to French Patent Application No. 01 13357 filed Oct. 17, 2001, the entire contents of which are hereby incorporated by reference.

BACKGROUND OF THE INVENTION

The invention relates to antiscattering grids and particularly to antiscattering grids used in X-ray imaging. A radiology imaging apparatus may comprise an X-ray source and an image receiver between which the object, of which it is wished to produce an image, is positioned. The beam emitted by the source passes through the object before reaching the detector. It is partly absorbed by the internal structure of the object so that the intensity of the beam received by the detector is attenuated. The overall attenuation of the beam after having passed through the object is directly related to the absorption distribution in the object.

The image receiver may comprise an optoelectronic detector or enhancing film/screen pair sensitive to the intensity of the radiation. The image generated by the receiver corresponds in principle to the distribution of the overall attenuations of the rays due to having passed through the internal structures of the object.

One part of the radiation emitted by the source is absorbed by the internal structure of the object and the other part is either transmitted (primary or direct radiation) or scattered (secondary or scattered radiation). The presence of scattered radiation results in the contrast of the image obtained being degraded and the signal/noise ratio being reduced.

One solution to this problem comprises interposing one or more "antiscattering" grids between the object to be X-rayed and the image receiver. This grid is usually formed by a series of parallel plates made of a material that absorbs the X-rays. In a grid identified as a "focused" grid (using the terminology defined by the CEI 60627 standard relating to "X-ray imaging diagnostic equipment—characteristics of the antiscattering grids for general use and for mammography"), all the planes of the plates intersect along the same straight line passing through the focal point of the radiation emitted by the source.

A antiscattering grid may comprise a series of oriented parallel plates made of a material which strongly absorbs the X-rays, for example, lead, and are held together between inter-plate members made of a material more transparent to X-rays than the plates, such as, for example, aluminum or cellulose fibers (paper or wood). A disadvantage for such a grid is that the grid is unable to reduce the degree of radiation scattered in a direction parallel to the plane of the plates. Crossed grids having two series of absorbent plates, in which the two plates are positioned perpendicular to each other, reduce this disadvantage. The crossed grids allow two-dimensional filtering to be obtained and thus further reduce the solid angle with which a point on the receiver sees the object.

However, the presence of inter-plate members between the plates reduces the transmission of the direct radiation through the grid. Consequently, the X-ray dose needed to obtain an image of good quality must be increased (particularly in mammography).

There are several structural arrangements for obtaining grids without inter-plate members. One structural arrangement is two-dimensional filtering comprising superposing one-dimensional grids. U.S. Pat. No. 5,307,394 describe an antiscattering device comprising the superposition of several grids. Each grid has parallel absorbent plates separated by openings, the plates being positioned at an angle of between 0 and 89.9° with respect to the central beam perpendicular to the plane of the receiver. The grids have a thickness such that the ratio of the thickness of the grid to the distance between the plates is greater than 1. This arrangement provides filtering of the rays whose angle of incidence is high.

Another structural arrangement comprises producing two-dimensional grids directly in a one-piece support. U.S. Pat. No. 5,389,473 describes a method of manufacturing an antiscattering grid, comprising producing a grid from a glass plate, making openings in the plate by photoetching and chemical etching (for example using hydrofluoric acid). Such a method results in an array of cells separated by partitions being formed. The partitions are then covered with a layer of material that absorbs the X-rays.

WO 94/17533 describes an antiscattering grid comprising a lattice formed in a glass plate, the lattice comprising cells separated by partitions. The partitions are covered with a layer of absorbent material, not only inside the cells but also along their edges corresponding to the upper and lower surfaces of the glass plate.

In the field of mammography, another type of two-dimensional grid has been developed. U.S. Pat. No. 5,606,589 describe an antiscattering grid comprising thin metal sheets micro-etched to form a lattice. The sheets are superposed so as to form a focused grid. The sheets are held stacked together by adhesive bonding.

U.S. Pat. No. 5,814,235 describes a method of manufacturing such a grid. The method comprises forming, by photoetching in a metal foil, a lattice structure comprising cells separated by segments extending in transverse directions. The foils are then individually immersed in a bath of adhesive. The foils are then stacked on top of each other so as to align the segments in order to form partitions between the cells and then clamped together in position. This method makes it possible in particular to obtain strong grids.

U.S. Pat. No. 6,075,840 generalizes this type of grid for applications other than mammography.

The disadvantage with the above methods is that they are based on the chemical etching of layers of materials and consequently result in a significant loss of material, and hence high costs.

Moreover, a disadvantage with the antiscattering grids in general is that they mask part of the image receiver and leave their impression on the image obtained. A solution to this problem comprises slightly shifting the grid during image acquisition. Thus, the image obtained comprises the superposition of images, for which the grid lies in different positions.

In certain cases, it is possible to translate the grid only in a single direction (in particular in mammography, in which the direction of displacement is parallel to the patient's thoracic cage). In this case, the impressions of the segments or of the partitions which are positioned parallel to the direction of displacement of the grid remain on the image obtained. U.S. Pat. No. 5,970,118 describes an antiscattering grid formed in a glass plate in which the partitions of the cells are not parallel to the side of the grid parallel to the direction of displacement of the latter. For example, the grid may comprise cells having a square shape and oriented at 35° with respect to an edge of the grid parallel to the direction of displacement.

BRIEF DESCRIPTION OF THE INVENTION

An embodiment provides a grid that is two dimensional for limiting the filtering of the direct radiation. An embodiment provides an antiscattering grid for radiation, particularly for an X-ray imaging apparatus, of the type comprising a substrate having a plurality of metallized partitions that together define a plurality of cells distributed over the substrate. The partitions allow passage of radiation emitted from a source lying in line with the grid, and absorbing the radiation not coming directly from this source. In an embodiment of the invention the substrate is made of a polymer material. The polymer material is less absorbent of the radiation and therefore permits more of the direct radiation to pass through. This feature permits in particular the reduction of the radiation doses administered to the object.

In an embodiment the external surfaces of the substrate are not metallized, thereby allowing some of the direct radiation to pass through the substrate. This makes it possible to further increase the quality of the image without increasing the radiation doses administered to the object.

In an embodiment as the substrate is less absorbent of radiation the gird has less strict dimensioning constraints while still exhibiting superior performance.

An embodiment is a method for the manufacture of such grids. An embodiment is a method of manufacturing an antiscattering grid comprising a substrate made of a polymer material, in which the substrate is formed by radiation curing of a monomer sensitive to the radiation. The method may comprise, for example, laser photolithography (and in particular the technique known as "stereolithography") or X-ray lithography.

The method of manufacturing an antiscattering grid may comprise: (a) forming, for example, by stereolithography, a substrate having a plurality of partitions which together define a plurality of cells distributed over the said substrate; and (b) depositing a layer of metal on the surface of the substrate. In an embodiment of the method, the substrate of the grid may be formed from a wide range of low-density materials. It may, for example, comprise an epoxy resin or an acrylic resin. These materials have a density and an atomic number that are low enough to have low radiation absorption, particularly for X-rays.

Forming the substrate by, for example, stereolithography, allows small cells to be obtained. In particular, in an embodiment of the invention, there may be two broad types of grids. A grid may have cells with openings of about 200 μm (micrometers) to about 300 μm and comprising partitions having a thickness of about 50 μm to about 100 μm. A grid having a pitch of about 50 μm to about 100 μm and comprising partitions having a thickness of about 20 μm to about 50 μm.

BRIEF DESCRIPTION OF THE DRAWING

The above embodiments will be better understood from the following description, which is purely illustrative and non-limiting, and the appended figures in which:

FIG. 1 is a schematic representation the principles of operation of an antiscattering grid positioned in a camera of a radiology apparatus;

FIG. 2 is a sectional representation of a grid of an embodiment and illustrating the paths followed by the direct and scattered rays through the grid;

FIG. 3 is a schematic representation of a substrate comprising an antiscattering grid according to an embodiment;

FIG. 4 is a cross-sectional representation, with exaggerated proportions, of a substrate formed by an embodiment of the method for manufacturing the grid;

FIG. 5 shows schematically a first step in the manufacture of the grid, this step corresponding to the production of the substrate shown in FIG. 4 by stereolithography;

FIG. 6 shows schematically an intermediate step in the production of the substrate, during which a layer of polymer is produced by stereolithography; and FIG. 7 is a detailed diagram of the grid obtained.

DETAILED DESCRIPTION OF THE INVENTION

FIG. 1 shows schematically the principle of operation of an antiscattering grid 1 mounted in a radiology apparatus. The grid 1 is positioned in front of a detector screen 42 so that the radiation source 44 is located at the focal point O of the grid 1. One part of the direct radiation D emitted by the source 44 passes through an object 46, the image of which it is wished to obtain, without undergoing distortion. Another part d of the radiation is scattered by the object 46 so that it strikes the grid at an angle α to the focusing direction of the grid 1. Since the internal partitions of the grid 1 are focused, they absorb the scattered radiation d.

FIG. 2 shows more specifically the paths of the radiation, during image acquisition, through an antiscattering grid of an embodiment. The grid comprises a substrate 2 made of a polymer material, comprising partitions 8 which define cells 12. The internal walls of the cells 12 are covered with a metal layer 14. A part D1 of the direct radiation D passes through the grid 1 via the substrate 2, while another part D2 passes through the grid 1 via the cells 12. Because of the low density of the polymer of which the substrate 2 is formed, the radiation D1 undergoes little attenuation.

The internal walls of the cells 12 are covered with a metal layer 14 that absorbs the scattered radiation d striking the grid 1 at too great an angle α to the focusing direction of one of the cells 12.

An embodiment is directed to two types of grids. A first type, of which the grids have an opening x of about 200 μm to about 300 μm and comprise partitions having a thickness e of about 50 μm to about 100 μm; and a second type of finer grids with a pitch of about 50 μm to about 100 μm and comprising partitions having a thickness e of about 20 μm to about 50 μm.

Grids for a radiology apparatus, for example, in mammography, may have a ratio of the thickness of the grid to the distance between the partitions of between 3 and 5. The disclosed embodiments makes it possible to obtain grids having ratios greater than 8, whether the grids are linear or crossed. This feature ensures filtering of the rays whose angle of incidence deviates, even slightly, from the direction of direct radiation and consequently results in grids having extremely high rejection properties.

In the case of grids of the first type mentioned above, a grid thickness e of greater than about 1.6 mm or about 2.4 mm, and less than about 3 mm, is obtained (should the ratio reach 10). In the case of grids of the second type, a grid thickness e of greater than about 0.4 mm or about 0.8 mm, and less than about 1 mm, is obtained (should the ratio reach 10).

It may be advantageous to choose to manufacture a grid having a pitch equal to the period of the digital detector of the camera. This feature makes it possible to eliminate the gain modulations introduced by the grid and prevent a deflection generated by the superposition of the grid and of the detector from being obtained.

FIG. 3 shows the overall shape of a substrate 2 of a focused antiscattering grid according to one embodiment. The substrate is in the form of a substantially planar element, of thickness e, having two principal faces, an upper face 4 and a lower face 6. The substrate is composed of intersecting partitions 8 defining cells 12 passing through the substrate from one of its principal faces to the other. The substrate 2 is "focused", that is to say by definition, the planes containing the partitions 8 between the cells 12 all have the same focal point O, as shown in FIG. 4.

In FIG. 3, the cells 12 are square in shape and define a quasi-periodic pattern (or instead one in which the pitch or the period varies continuously). The pitch may correspond to the distance between two successive parallel partitions.

Cells having various polyhedral shapes are possible. However, in an embodiment cells preferably have the shape of a parallelogram. A parallelogram is that category of shapes which minimizes as far as possible the surface area occupied by the partitions and therefore makes it possible to minimize the absorption of the grid.

It will also be understood that the partitions separating the cells are not necessarily aligned. They may be parallel and offset from one cell to the next. This gives the grid some advantages. In particular, this feature makes it possible to minimize the generation of impressions of the partitions on the image obtained when these impressions are approximately parallel to the direction of displacement of the grid.

One embodiment of a substrate is described as follows. The substrate 2 is designed by computer-aided design. The geometrical features of the substrate 2 are defined according to the desired properties of the grid. From these geometrical features, a polyhedral surface model is generated which can be exported to the STL (standing for stereolithography) format. This format allows an object to be described in the form of a polyhedron having triangular facets.

Next, the sections of the substrate 2 to be produced by successive cutting of parallel horizontal planes are defined. The distance between each section corresponds to the thickness of a layer.

FIG. 5 shows a first step in the manufacture of a substrate by stereolithography. A precursor fluid 22 (for example photosensitive liquid acrylate or epoxy resins) is contained in a tank 24 kept at a high pressure (between 300 kPa and 7000 kPa) by means of a pump device 26 connected to the tank 24 and in communication with the precursor fluid 22. The tank 24 is closed in its upper part by a window 28 (made of quartz, sapphire or silica).

FIG. 5 shows a platform 34, the principal surface of which is parallel to the free surface of the fluid 22 and is mounted on an elevator (not shown) which can be translationally actuated perpendicular to the plane of the platform 34. FIG. 5 shows a source 32 emitting a beam through a lens 36 to an arrangement of mirrors 38. The source 32 is, for example, an ultraviolet laser source. The mirrors 38 are used to deflect the beam emitted by the source 32 onto the free surface of the precursor fluid 22. The mirrors are positionally controlled by a computer so as to perform a point-by-point scan of the layer of fluid 22 close to its free surface.

The ultraviolet radiation emitted by the source 32 causes local curing of the precursor fluid 22. The mirrors 38 are controlled so that the beam draws on the surface of the fluid a pattern corresponding to the lower surface of the substrate 2. When a first layer of polymer has been thus produced, the elevator is actuated in order to lower the platform 34 supporting the cured layer by a height corresponding to the thickness of one layer (the thickness of a layer is determined by the level of viscosity of the precursor fluid chosen—it is generally less than one-tenth of a millimeter). Next, the source again draws a new pattern in order to create a second layer on the first layer.

Each cured layer is in the form of a lattice comprising segments defining openings. The layers are produced in succession so that the segments of two adjacent layers are superposed, thus forming the partitions of the cells of the substrate. The final substrate obtained is a one-piece substrate.

FIG. 6 shows an intermediate step during which a layer 52 of polymer is produced by stereolithography on that part 54 of the substrate that has already been produced. The final substrate 2 obtained is a one-piece substrate.

When the substrate 2 has been completed, the precursor fluid 22 contained in the tank 24 that has not reacted is drained off.

As shown in FIG. 4, the relative positions and dimensions of the openings and of the segments vary progressively from one layer to the next. In this way, it is possible to construct a substrate 2 having focused cells 12 for the purpose of obtaining a focused grid.

One particular way of implementing an embodiment of the method in which point-by-point stereolithography is used has been described. It will be understood that it is possible to use other rapid prototyping techniques such as, for example, whole-layer stereolithography, in which the source illuminates the surface of the fluid through a mask defining a complementary shape of the pattern to be produced.

In a second step, the surface of the substrate 2 is metallized, by a chemical vapor deposition (CVD) process. The detail of a grid 1 thus obtained is shown in FIG. 7. Such a method is used to obtain a metal layer 14 having a thickness of the order of a few µm.

The absorbent metals preferably used are gold (in the form of a layer from 2 µm to 5 µm in thickness), copper (in the form of a layer from about 10 µm to about 20 µm in thickness), tantalum (in the form of a layer from about 2 µm to about 10 µm in thickness) or possibly lead. These materials may be used by themselves, in combination or in association with other materials.

It is also possible to employ other metallization processes such as, for example, physical vapor deposition (PVD) or electrolysis. It is also possible to deposit a first thin layer on the substrate by sputtering and then to deposit a second layer on the first layer by an electroplating technique.

In a third step, those parts of the metal layer provided on or covering the upper surface 4 and the lower surface 6 of the substrate are removed. In one embodiment the metal layer can be removed by abrasion. In another embodiment the metal layer can be removed by plasma etching. When using plasma etching the semi-finished grid is place in a plasma reactor. The reactor may be of type used in the manufacture of micro electro mechanical systems (MEMS) or semiconductor integrated circuits. A plasma reactor of this type is available from Alcatel Micro Machining Systems (MMS) or Plasma Etch Inc. Plasma etching occurs in a vacuum and uses radio frequency energy to create plasma. The ions of the plasma react with the metallic layer that is to be removed.

In an alternative embodiment, simple dry plasma etching may be used. In simple dry plasma etching, gas contained in the reactor forms a simple plasma. The particle of metal located on the exposed surface of the metallic layer is removed by the impact of the ions contained in the plasma.

In a further alternative embodiment, plasma etching in the presence of active gas may be used. A reactive gas, for example, $SF_6$, is introduced into the plasma so as to produce a combined physical and chemical etching.

In a still further embodiment, laser ablation may be used. In laser ablation, the metallic layer is exposed to a focused radiation beam provided by a laser source. Laser ablation provides mechanical etching of the particles of metal. The laser source may a laser emitting in the ultraviolet band, such as Excimer laser sources. The laser source is controlled so as to sweep over the surface of the grid. The size of the laser spot generated by the radiation beam depends on the power of the source and the ablation threshold of the metal to be removed. The duration of the ablation process depends on the spot size, the pulse frequency of the laser source (in the case of a pulsed laser source), the thickness of the metal layer to be removed and the area of surface to be treated. The upper and lower surfaces can be de-coated one at a time. However, it is possible to de-coat both surfaces simultaneously using two laser source or one laser source and a beam splitter.

The removal of the metal layer by plasma etching or laser ablation is more advantageous than removal by abrasion. Plasma etching or laser ablation provides a substantially uniform removal of the metal layer from desired surfaces of the grid and provides a substantially clean cut of the metal layer at the edges of the cell walls. A substantially uniform removal and cut of the metal layer may maintain a high transmission of the radiation through the grid.

The described techniques for removal of the metallic layer are easy to implement through available manufacturing and industrial processes and tools with reasonable and acceptable costs.

It is also possible, after the metallization step, to fill the cells 12 with a polymer similar to the polymer of which the substrate 2 is made. Using this additional operation, the antiscattering grid is made homogeneous and the attenuation is thus distributed uniformly, in order to reduce any artifacts that it generates on the images obtained. This is mainly so in the case of grids having a thickness of less than about 1 mm, the attenuation of which is negligible.

The manufacture of a plane grid has been described, but it is also possible to produce in the same way, grids comprising a substrate made of a polymer material of different shape. For example, the thickness of the grid is not necessarily constant. Thus, grids called "roof-shaped" grids (the terminology used in the CEI standard) may be produced.

One skilled in the art may make various modifications in structure and/or function and/or steps and equivalents thereof to the disclosed embodiments without departing from the scope and extent of the invention as recited in the claims.

What is claimed is:

1. A method of manufacturing an antiscattering grid comprising:
    providing a substrate made of a polymer material which is formed by radiation curing a monomer sensitive to the radiation;
    forming the substrate into a grid by radiation curing the substrate exposed to the radiation to have a plurality of cured partitions which define a plurality of cells passing through the substrate; and
    providing a layer of metal on a surface of the substrate, thereby resulting in the antiscattering grid comprising the plurality of cured partitions having metal-layered cells passing through the substrate;
    wherein the metal-layered cells define open-air openings passing completely through the antiscattering grid.

2. The method according to claim 1 wherein the metal layer provided on the surface of the substrate is formed by chemical vapor deposition.

3. The method according to claim 1 wherein:
    the metal layer is provided on all of the surfaces of the substrate; and
    the metal on external surfaces of the substrate is removed in order to leave only the metal covering the partitions inside the cells.

4. The method according to claim 3 wherein the metal layer on the external surfaces of the substrate is removed by abrasion.

5. The method according to claim 3 wherein the metal layer on the external surfaces of the substrate is removed by plasma etching.

6. The method according to claim 3 wherein the metal layer on the external surfaces of the substrate is removed by laser ablation.

7. The method according to claim 1 wherein the providing a metal layer step comprises providing a metal layer which covers the partitions inside the cells but not on external surfaces of the substrate outside the cells.

8. The method according to claim 7 wherein the external surfaces of the substrate outside the cells are masked during the providing a layer of metal step so as to provide the metal only on the partitions inside the cells.

9. The method according to claim 1 wherein the metal comprises at least one layer formed by a metal selected from the group consisting of gold, copper, tantalum and lead.

10. The method according to claim 1 wherein the monomer is a resin selected from the group consisting of epoxy and acrylic.

11. The method according to claim 1 wherein the substrate has a substantially planar shape.

12. The method according to claim 1 wherein the cells have a polyhedral shape.

13. The method according to claim 1 wherein the partitions are formed to orient as a focused grid.

14. The method of claim 1, wherein the curing technique used is stereolithography.

15. The method according to claim 14 wherein the substrate is formed by point-by-point stereolithography.

16. The method according to claim 14 wherein the substrate is formed by whole-layer stereolithography.

17. The method of claim 1, wherein the providing a layer of metal comprises:
    depositing a layer of metal upon the substrate such that a cross section of the antiscattering grid comprises polymer material disposed between two instances of the layer of the metal deposited and the cells defining open-air openings are disposed between another two instances of the layer of metal deposited.

18. The method of claim 1, further comprising:
    subsequent to the providing a layer of metal, filling the cells with a polymer.

19. A method of manufacturing an antiscattering grid comprising:

providing a substrate made of a polymer material which is formed by radiation curing a monomer sensitive to the radiation;

forming the substrate into a grid by radiation curing the substrate exposed to the radiation to have a plurality of cured partitions which define a plurality of cells passing through the substrate;

providing a layer of metal on a surface of the substrate; and filling the cells with a polymer.

20. The method according to claim 19 comprising filling the cells with a polymer which is similar to the polymer of the substrate.

21. A method of manufacturing an antiscattering grid comprising:

providing a substantially planar substrate made of a polymer material of a given thickness and sensitive to radiation;

forming in the substrate by radiation curing of the polymer material a plurality of partitions which define a plurality of cells passing through the substrate and are oriented to a focal point; and providing a layer of metal on a surface of the substrate, thereby resulting in the antiscattering grid comprising the plurality of partitions having metal-layered cells passing through the substrate;

wherein the metal-layered cells define open-air openings passing completely through the antiscattering grid.

22. The method according to claim 21 wherein the ratio of the grid thickness to the distance between partitions is a ratio of greater than 8.

23. The method according to claim 21 wherein the cells are formed to have an opening of about 200 µm to about 300 µm and the partitions are formed to have a thickness of about 50 µm to about 100 µm.

24. The method according to claim 21 wherein the cells are formed to have a pitch of about 50 µm to about 100 µm and the partitions are formed to have a thickness of about 20 µm to about 50 µm.

25. The method according to claim 21 wherein the cells are formed to have a shape of a parallelogram.

26. The method according to claim 21 wherein the substrate is formed to have a thickness that is not constant.

27. The method according to claim 21 wherein the grid is formed to have a thickness of greater than about 1.6 mm and less than about 3 mm.

28. The method according to claim 21 wherein the grid is formed to have a thickness of greater than about 0.4 mm and less than about 1 mm.

29. The method according to claim 21 wherein the cells are formed to have a quasi-periodic pattern.

30. The method according to claim 21 wherein the cells are formed to have a pattern in which the pitch or the period varies continuously.

31. A method of manufacturing an antiscattering grid comprising:

providing a monomer precursor fluid sensitive to and curable by radiation;

curing the fluid by radiation to form a substrate defining a grid, wherein the fluid exposed to the radiation is cured to form a plurality of cured partitions which define a plurality of cells passing through the substrate; and providing a layer of metal on a surface of the substrate thereby resulting in the antiscattering grid comprising the plurality of cured partitions having metal-layered cells passing through the substrate;

wherein the metal-layered cells define open-air openings passing completely through the antiscattering grid.

32. The method of claim 31, wherein the providing comprises:

providing the metal such that the metal covers only the partitions inside the cells.

33. The method of claim 31, wherein:

the cells have a polyhedral shape.

34. The method of claim 31, wherein:

the partitions are formed to orient as a focused grid.

35. The method of claim 31, wherein:

the cells are formed to have a quasi-periodic pattern.

36. The method of claim 31, wherein:

the cells are formed to have a pattern in which the pitch or the period varies continuously.

37. The method of claim 31, wherein:

at least some of the partitions separating the cells are misaligned.

38. The method of claim 31, wherein:

the substrate is a one-piece substrate.

39. The method of claim 31, wherein:

the metal layer provided on the surface of the substrate is formed by chemical vapor deposition.

40. The method of claim 31, wherein the curing comprises stereolithography.

41. A method of manufacturing an antiscattering grid comprising:

providing a substrate made of a polymer material which is formed by radiation curing a monomer sensitive to the radiation;

forming a polymer lattice by radiation curing the substrate exposed to the radiation, the polymer lattice comprising a plurality of cured polymer partitions that define a plurality of interior walls of open-air through cells passing completely through the polymer lattice; and providing a layer of metal on a surface of the polymer lattice, thereby resulting in the antiscattering grid comprising a metal-layered polymer lattice comprising the plurality of cured polymer partitions that define a plurality of metal-layered interior walls of open-air through cells passing completely through the antiscattering grid.

42. The method of claim 41, wherein the providing a layer of metal comprises:

depositing a layer of metal upon the polymer lattice such that a cross section of the antiscattering grid comprises polymer material disposed between two instances of the plurality of metal-layered interior walls and air disposed between another two instances of the plurality of metal-layered interior walls.

43. The method of claim 41, further comprising:

subsequent to the providing a layer of metal, filling the open-air through cells with a polymer.

44. The method according to claim 41 wherein the metal layer provided on the surface of the substrate is formed by chemical vapor deposition.

45. The method according to claim 41 wherein:

the metal layer is provided on all of the surfaces of the polymer lattice; and the metal on external surfaces of the polymer lattice outside of the cells is removed in order to leave only the metal covering the plurality of interior walls inside the cells.

46. The method according to claim 45 wherein the metal layer on the external surfaces of the polymer lattice is removed by abrasion.

47. The method according to claim 45 wherein the metal layer on the external surfaces of the polymer lattice is removed by plasma etching.

48. The method according to claim 45 wherein the metal layer on the external surfaces of the polymer lattice is removed by laser ablation.

49. The method according to claim 41 wherein the providing a metal layer step comprises providing a metal layer which covers the plurality of interior walls but not external surfaces of the polymer lattice outside of the cells.

50. The method according to claim 49 wherein the external surfaces of the polymer lattice outside of the cells are masked during the providing a layer of metal step so as to provide the metal only on the plurality of interior walls.

51. The method of claim 41, wherein the curing comprises stereolithography.

52. The method according to claim 51 wherein the substrate is formed by point-by-point stereolithography.

53. The method according to claim 51 wherein the substrate is formed by whole-layer stereolithography.

* * * * *